United States Patent
Kuo et al.

(10) Patent No.: US 7,172,331 B2
(45) Date of Patent: Feb. 6, 2007

(54) BACKLIGHT MODULE

(75) Inventors: Chien-Hung Kuo, Taichung County (TW); Ying Szutu, Taichung County (TW)

(73) Assignee: AU Optronics Corp., Hsinchu (TW)

( * ) Notice: Subject to any disclaimer, the term of this patent is extended or adjusted under 35 U.S.C. 154(b) by 108 days.

(21) Appl. No.: 11/025,918

(22) Filed: Jan. 3, 2005

(65) Prior Publication Data
US 2006/0012982 A1   Jan. 19, 2006

(30) Foreign Application Priority Data
Jul. 14, 2004   (TW)   .............. 93121059 A

(51) Int. Cl.
*F21V 15/01* (2006.01)
(52) U.S. Cl. ............... 362/634; 362/632; 362/362
(58) Field of Classification Search ............. 362/29, 362/30, 97, 634, 632, 362; 349/65, 70
See application file for complete search history.

(56) References Cited
U.S. PATENT DOCUMENTS
6,722,773 B2 * 4/2004 Tsai et al. ............... 362/216
6,974,221 B2 * 12/2005 Wu et al. ............... 362/29
2004/0257792 A1 * 12/2004 Yu et al. ............... 362/31
2005/0225960 A1 * 10/2005 Tsai ............... 362/23

FOREIGN PATENT DOCUMENTS
JP    2001-210126    *  8/2001

* cited by examiner

*Primary Examiner*—Laura K. Tso
(74) *Attorney, Agent, or Firm*—Bacon & Thomas, PLLC

(57) ABSTRACT

A backlight module is provided. The backlight module includes a frame, a reflector and a holding structure for holding the reflector on the frame. The frame has a first through hole and the reflector has a second through hole. The reflector is disposed on the frame. The holding structure includes a first clamp portion, a second clamp portion and a shaft portion. The shaft portion is used for connecting the first clamp portion and the second clamp portion. The first clamp portion and the second clamp portion are used for clamping the reflector and the frame when the shaft portion is inserted into the first through hole and the second through hole.

8 Claims, 6 Drawing Sheets

BACKLIGHT MODULE

This application claims the benefit of Taiwan application Serial No. 93121059, filed Jul. 14, 2004, the subject matter of which is incorporated herein by reference.

BACKGROUND OF THE INVENTION

1. Field of the Invention

The invention relates in general to a backlight module, and more particularly to a backlight module having a holding structure for holding a reflector on a frame.

2. Description of the Related Art

With advanced technologies and fast development, liquid crystal displays (LCDs), with advantages of thin size, electricity economy, and no radiation, have been popularly applied to various electrical products such as personal digital assistant (PDA), notebooks, digital camera, digital video recorder, cellular phones, computer displays and LCD TV, and so on. Because display panels in LCDs are non-emissive, it is necessary to use backlight modules as a light resource.

Referring to FIG. 1A, it is a cross-sectional view of a conventional liquid crystal display. In FIG. 1A, a liquid crystal display 9 mainly includes a display panel 8a and a backlight module 8b. The backlight module 8b includes a frame 2, a reflector 3, a resource module having several fluorescent lamps 4, and an optical film module including a diffusing plate 5, a diffuser 7, and a prism film 6. As shown in FIG. 1B, the frame 2 has a container 2a, and the reflector 3 is attached to the bottom 2b and two side 2c of the container 2a via an adhesive 8c. The fluorescent lamps 4 are arranged in the container 2a and positioned on the reflector 3. The diffusing plate 5 is disposed on the fluorescent lamps 4 and the prism film 6 is disposed on the diffusing plate 5. The diffuser 7 is disposed on the prism film 6, and the display panel 8a is disposed on the diffuser 7. Light emitted by the fluorescent lamps 4 is reflected by the reflector 3 into the diffusing plate 5, and then is guided through the diffusing plate 5, the prism film 6, and diffuser 7 onto the display panel 8a.

However, due to a trend of big size of LCDs, the sizes of display panels, reflectors, and frames are enlarged, and the procedure of attaching the reflectors onto the frames becomes more difficult. Once the sizes of reflectors and frames are enlarged, it easily brings roughness and unevenness in reflector's surface when the reflector is attached onto the surface of frame. Therefore, the displaying quality of LCDs is greatly affected and the "mura" may be easily shown on the LCDs' screen.

SUMMARY OF THE INVENTION

It is therefore an object of the invention to provide a backlight module having a holding structure for holding a reflector on a frame, instead of using an adhesive attaching the reflector onto the frame conventionally, not only to omit the procedure of applying the adhesive, but also to prevent roughness and unevenness in reflector's surface when the reflector is attached onto the surface of frame. Therefore, the holding structure of the backlight module of the present invention can prevent the "mura" being shown on LCDs' screen and improve the displaying quality of LCDs.

The invention achieves the above-identified object by providing a backlight module. The backlight module includes a frame, a reflector and a holding structure for holding the reflector on the frame. The frame has a first through hole, and the reflector has a second through hole. The reflector is formed on the frame. The holding structure includes a first clamp portion, a second clamp portion and a shaft portion. The shaft portion is used for connecting the first clamp portion and the second clamp portion. When the reflector contacts the frame and the first through hole corresponds to the second through hole, the shaft portion is inserted into the first through hole and the second through hole, and thereby the first clamp portion and the second clamp portion inwardly clamp the reflector and the frame.

Also, the invention achieves the above-identified object by providing a backlight module. The backlight module includes a frame, a reflector and a holding structure for holding the reflector on the frame. The frame has a first through hole, and the reflector has a second through hole. The holding structure includes a first clamp structure and a second clamp structure. The first clamp structure includes a first clamp portion and a pin portion disposed on the first clamp portion. The second clamp structure includes a second clamp portion and a shaft portion disposed on the second clamp portion. The shaft portion has a fixing hole. The first clamp structure is adapted to combine with the second clamp structure and the pin portion is inserted into the fixing hole when the shaft portion is inserted into the first through hole and the second through hole, so that the first clamp portion and the second clamp portion are exposed out of the reflector and the frame to clamp the reflector and the frame.

Further, the invention achieves the above-identified object by providing a backlight module. The backlight module includes a frame, a reflector and a holding structure for holding the reflector on the frame. The frame has a first top surface. The reflector has a through hole, a second top surface and a bottom surface. The holding structure includes a shaft portion and a clamp portion. The shaft portion having an external side surface is disposed on the first surface, and is adapted for inserting in the through hole. The clamp portion is disposed on a top of the shaft portion. The clamp portion has a surface facing the first top surface and connecting to the first top surface via the external side surface. When the shaft portion is inserted into the through hole, the clamp portion is exposed out of the second top surface and contacts part of the second top surface, so that the clamp portion and the frame inwardly clamp the reflector.

Other objects, features, and advantages of the invention will become apparent from the following detailed description of the preferred but non-limiting embodiments. The following description is made with reference to the accompanying drawings.

DETAILED DESCRIPTION OF THE INVENTION

FIRST EXAMPLE

Figure 1A:
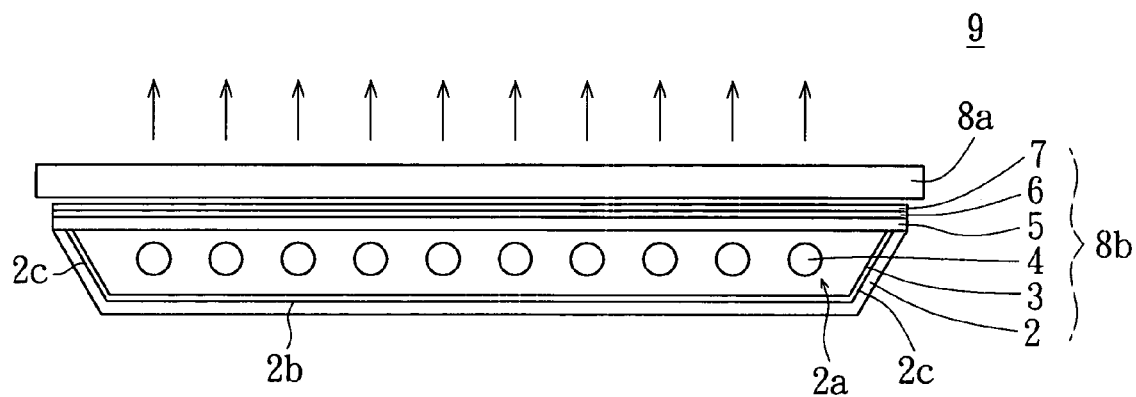
FIG. 1A (Prior Art) is a cross-sectional view of a conventional liquid crystal display.
Figure 1B:
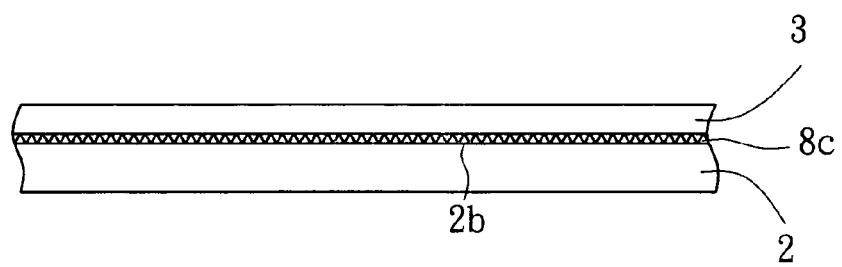
FIG. 1B (Prior Art) is a cross-sectional view showing the reflector, the adhesive and the frame of the backlight module in FIG. 1A.
Figure 2A:
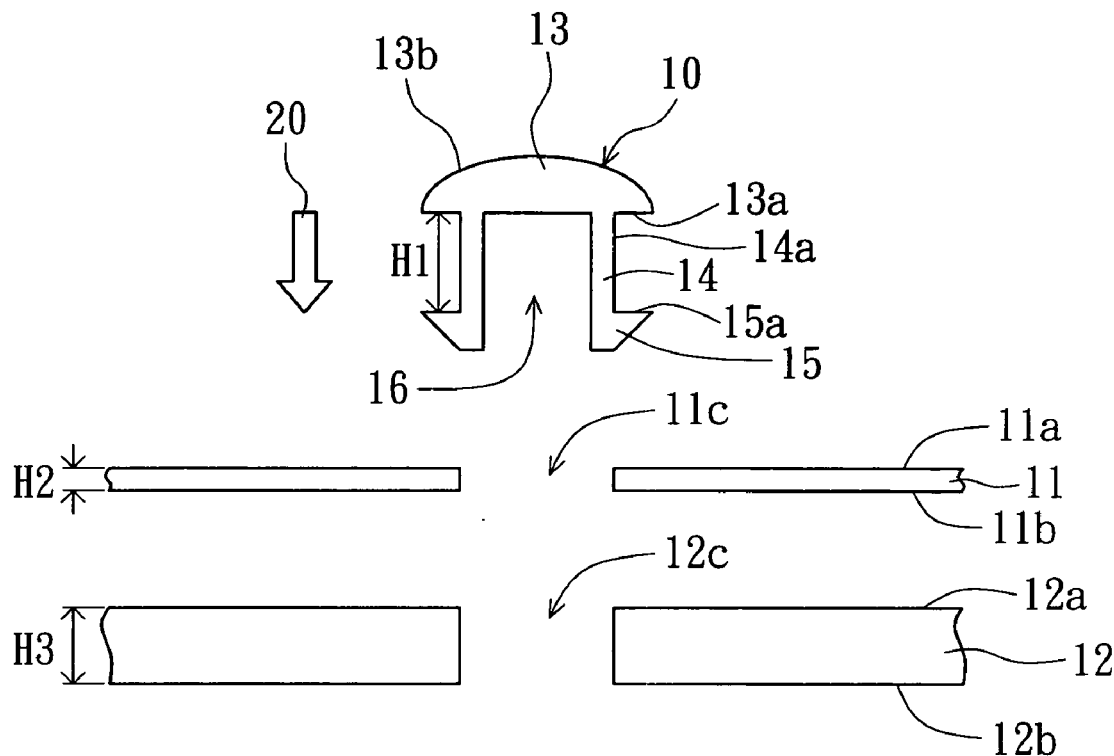
FIG. 2A is an exploded cross-sectional view showing a backlight module according to the first example of the preferred embodiment of the invention.
Figure 2B:
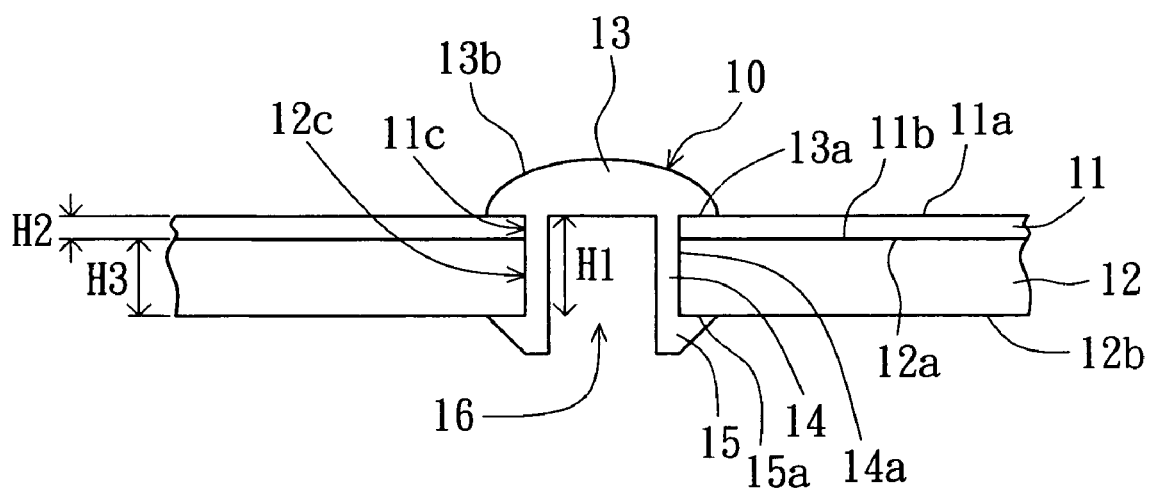
FIG. 2B is a combined cross-sectional view showing the backlight module according to the first example of the preferred embodiment of the invention.

Referring both to FIG. 2A and FIG. 2B, FIG. 2A is an exploded cross-sectional view showing a backlight module according to the first example of the preferred embodiment of the invention, and FIG. 2B is a combined cross-sectional view showing the backlight module according to the first example of the preferred embodiment of the invention. A backlight module includes a frame 11, a reflector 12 and a holding structure 10 of a backlight module for holding the reflector 11 on the frame 12, instead of using an adhesive attaching the reflector onto the frame conventionally. The reflector 11 has a top surface 11a, an opposite bottom surface 11b, and a through hole 11c which penetrates the top surface 11a and the bottom surface 11b. The frame 12 has a top surface 12a, an opposite bottom surface 12b, and a through hole 12c which penetrates the top surface 12a and the bottom surface 12b. The size of the through hole 11c is corresponding to that of the through hole 12c.

The holding structure 10 of the backlight module includes a first clamp portion 15, a second clamp portion 13 and a shaft portion 14. The shaft portion 14 is used for connecting the first clamp portion 15 and the second clamp portion 13. The first clamp portion 15 has a first surface 15a. The second clamp portion 13 has a second surface 13a facing the first surface 15a. The shaft portion 14 has an external side surface 14a for connecting the first surface 15a and the second surface 13a. Further, the shaft portion 14 and the first clamp portion 15 have a hollow 16. The hollow 16 does not penetrate the second clamp portion 13. The first clamp portion 15 is preferably a hook structure that bens to the outside of the hollow 16. Because the shaft portion 14 and the first clamp portion 15 have the hollow 16, the shaft portion 14 and the first clamp portion 15 can be pressed inwardly to allow the shaft portion 14 and the first clamp portion 15 to be inserted into the through holes 11c and 12c.

As shown in FIG. 2A, when a user wants to hold the reflector 11 on the frame 12, the user makes the through hole 11c correspond to the through hole 12c and let the bottom surface 11b contact the top surface 12a. Then, the user inserts the shaft portion 14 and the first clamp portion 15 into the through holes 11c and 12c along the direction of arrow 20 in FIG. 2A. Because the hollow 16 provides a buffering space for enabling the shaft portion 14 and the first clamp portion 15 to wind inwardly into the center of the opening of the hollow 16, so that the user easily inserts the shaft portion 14 and the first clamp portion 15 into the through holes 11c and 12c. As shown in FIG. 2B, when the first clamp portion 15 passes through the through holes 11c and 12c, and then the shaft portion 14 is inserted into the through holes 11c and 12c, the first clamp portion 15 and the second clamp portion 13 are exposed out of the bottom surface 12b and the top surface 11a respectively. Also, the first surface 15a and the second surface 13a contact part of the bottom surface 12 band the top surface 11a respectively. So that, the first clamp portion 15 and the second portion 13 inwardly clamp the reflector 11 and the frame 12, and the reflector 11 is fixed onto the frame 12.

However, any skilled in the art knows that the present invention is not limited thereto. For example, the first clamp portion 15, the second portion 13, and the shaft portion 14 can be integrally formed as a bone-shaped or an I-shaped structure. Also, the material of the holding structure 10 of backlight module includes poly methyl methacrylate (PMMA) or a white material. Further, the height H1 of the shaft portion 14 is equal or little less than the sum of the thickness H2 of the reflector 11 and the thickness H3 of the frame 12. The external shape of the cross section of the shaft portion 14 along the direction of the arrow 20 is corresponding to the shape of the through holes 11c and 12c. For example, when the shapes of the through holes 11c and 12c are round, the external shape of the cross section of the shaft portion 14 along the direction of the arrow 20 is also round. In the first example, the second clamp portion 13 further has a top surface 13b opposite to the second surface 13a and connected therewith. The top surface 13b is a bowl-shaped or a hemisphere-shaped whose opening faces the second surface 13a. That is to say, the second clamp portion 13 can be considered as an inverted bowl shape or a hemisphere shape structure.

SECOND EXAMPLE

Figure 3:
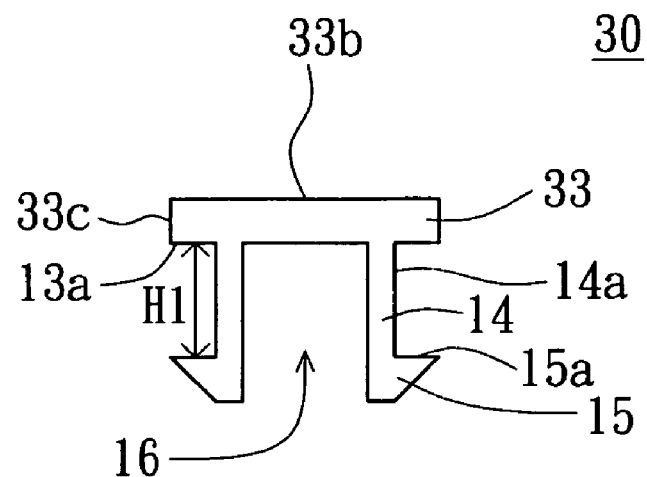
FIG. 3 is a cross-sectional view showing a holding structure of the backlight module according to the second example of the preferred embodiment of the invention.

Referring to FIG. 3, it is a cross-sectional view showing a holding structure of the backlight module according to the second example of the preferred embodiment of the invention. Most components of the holding structure 30 of the second example are similar to those of the holding structure 30 of the first example except for the second clamp portion 33, so that the symbols used in most components are the same. In FIG. 3, the second clamp portion 33 includes a second surface 13a, a top surface 33b and an external side surface 33c for connecting with the second surface 13a and the top surface 33b. In the second example, the top surface 33b is a flat surface, which means that the second clamp portion 33 can be considered as a cylinder shape structure. Also, the first clamp portion 15, the second portion 33, and the shaft portion 14 can be integrally formed as a bone-shaped or a I-shaped structure, and the material of the holding structure 30 of backlight module includes poly methyl methacrylate (PMMA) or a white material.

THIRD EXAMPLE

Figure 4:
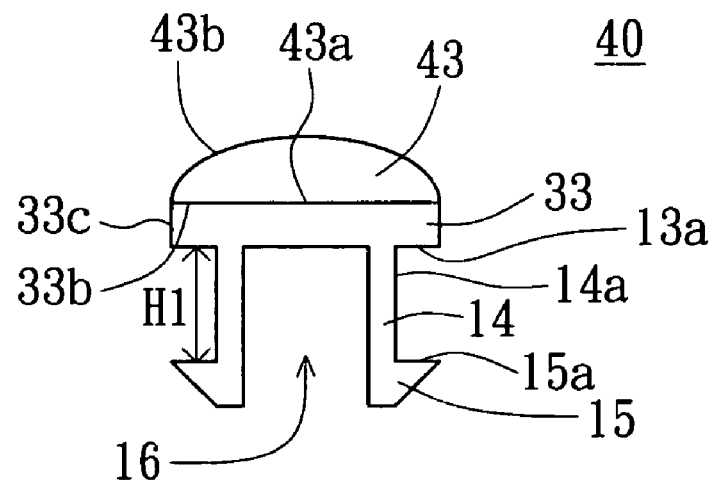
FIG. 4 is a cross-sectional view showing a holding structure of the backlight module according to the third example of the preferred embodiment of the invention.

Referring to FIG. 4, it is a cross-sectional view showing a holding structure of the backlight module according to the third example of the preferred embodiment of the invention. Most components of the holding structure 40 of the third example are similar to those of the holding structure 30 of the second example except for the holding structure 40 further having a cover 43, so that the symbols used in most components are the same. In FIG. 4, the cover 43 has a bottom surface 43a and a top surface 43b, which is connected to the bottom surface 43a. The cover 43 is disposed on the second clamp portion 33 when the bottom surface 43a faces the top surface 43a. The top surface 43b is a bowl-shaped or a hemisphere-shaped structure whose opening faces the bottom surface 43a. That is to say, cover 43 can be considered as an inverted bowl shape or a hemisphere shape structure. Also, the first clamp portion 15, the second portion 33, the cover 43, and the shaft portion 14 can be integrally formed as a bone-shaped or an I-shaped structure. Also, the material of the holding structure 40 of backlight module includes poly methyl methacrylate (PMMA) or a white material. When the cover 43 is a white structure, the other components of the holding structure 40 of the backlight module are not necessary to be chosen a white or a transparent material because the cover 43 covers other components of the holding structure 40 of the backlight module.

FOURTH EXAMPLE

Figure 5A:
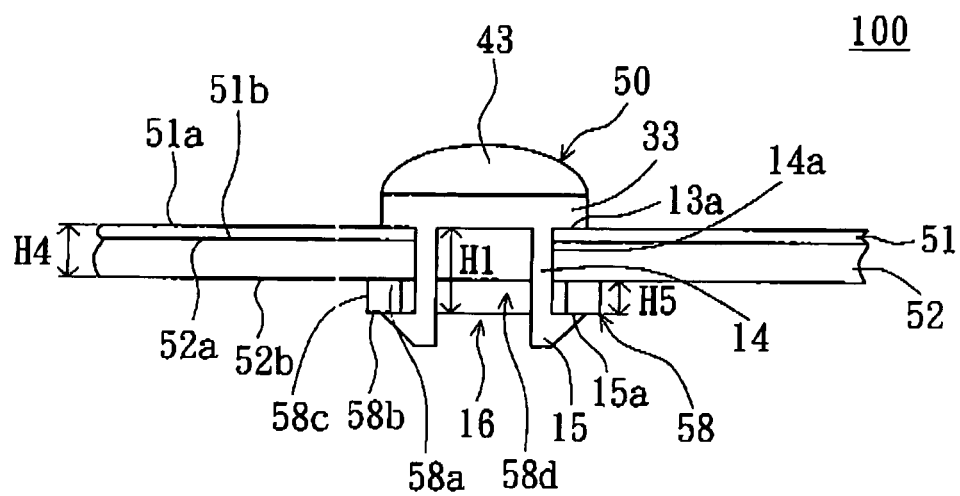
FIG. 5A is a combined cross-sectional view showing a backlight module according to the fourth example of the preferred embodiment of the invention.

Referring to FIG. 5A, it is a combined cross-sectional view showing a backlight module according to the fourth example of the preferred embodiment of the invention. In FIG. 5A, a backlight module 100 includes a frame 51, a reflector 52 and a holding structure 50 for holding the reflector 51 on the frame 52 instead of using an adhesive conventionally. The reflector 51 has a top surface 51a, an opposite bottom surface 51b, and a through hole 51c which penetrates the top surface 51a and the bottom surface 51b. The frame has a top surface 52a, an opposite bottom surface 52b, and a through hole 52c which penetrates the top surface 52a and the bottom surface 52b. The size of the through hole 51c is corresponding to that of the through hole 52c. In addition, the sum H4 of the thickness of the reflector 51 and the frame 52 is less than the height H1 of the shaft portion 14.

Most components of the holding structure 50 of the fourth example are similar to those of the holding structure 40 of the third example except for the holding structure 50 further having a washer 58, so that the symbols used in most components are the same. The washer 58 includes a top surface 58a, a bottom surface 58b and an external side surface 58c which connects the top surface 58a and the bottom surface 58b. The top surface 58a contacts part of the bottom surfaces 52b and the bottom surface 58b contacts the first surface 15a. Further, the washer 58 has an through hole 58d penetrating through the top surface 58a and the bottom surface 58b for allowing the shaft portion 14 and the first clamp portion 15 to insert therein. Besides, the thickness H5 of the washer 58 is equal or larger than the difference value of H1 and H4. Also, the size of the through hole 58d is corresponding to that of the through holes 51c and 52c.

When the first clamp portion 15 passes through the through hole 51c, the through hole 52c, and the through hole 58d, and the shaft portion 14 is inserted into the through holes 51c, 52c and 58d, the first clamp portion 15 and the second clamp portion 33 are respectively exposed out of the bottom surface 58b and the top surface 51a. Also, the first surface 15a and the second surface 33a respectively contact part of the bottom surface 58 band the top surface 51a. So that, the first clamp portion 15 and the second portion 33 inwardly clamp the reflector 51 and the frame 52, and the reflector 51 is fixed onto the frame 52.

Figure 5B:
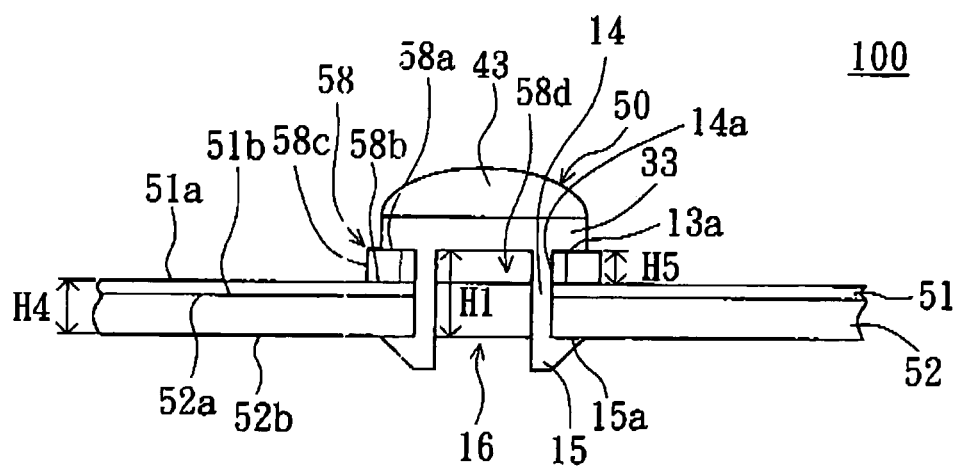
FIG. 5B is another combined cross-sectional view showing a backlight module according to the fourth example of the preferred embodiment of the invention.

However, any skilled in the art knows that the present invention is not limited thereto. Referring to FIG. 5B, the washer 58 can be disposed between the second clamp portion 33 and the reflector 51, so that the top surface 58a contacts the second surface 13a and the bottom surface 58b contacts part of the top surface 51a.

FIFTH EXAMPLE

Figure 6A:
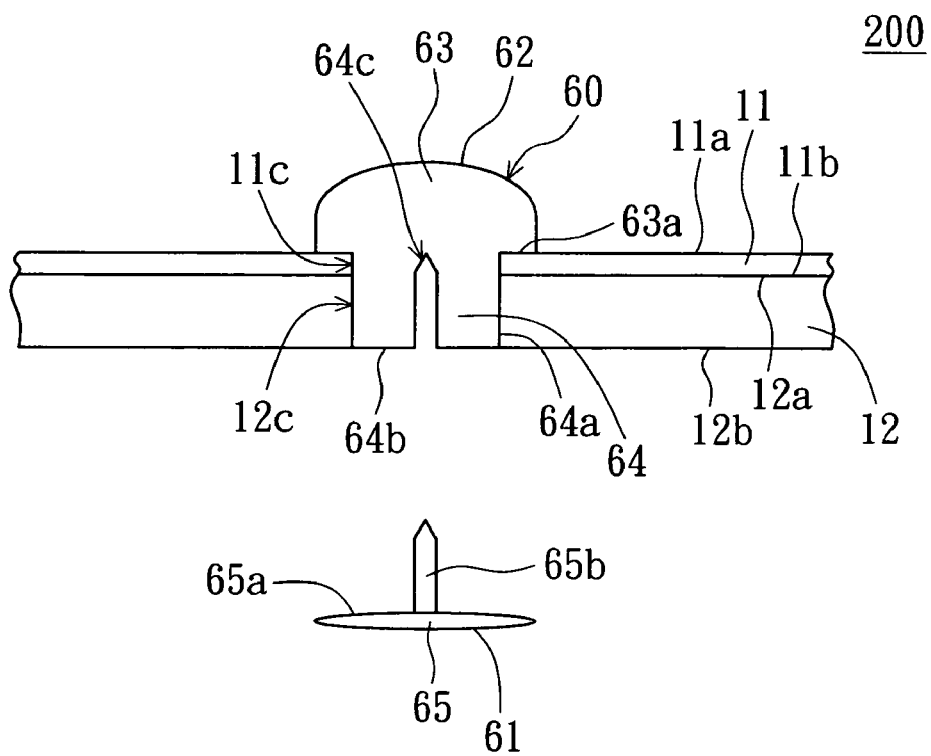
FIG. 6A is an exploded cross-sectional view showing a backlight module according to the fifth example of the preferred embodiment of the invention.
Figure 6B:
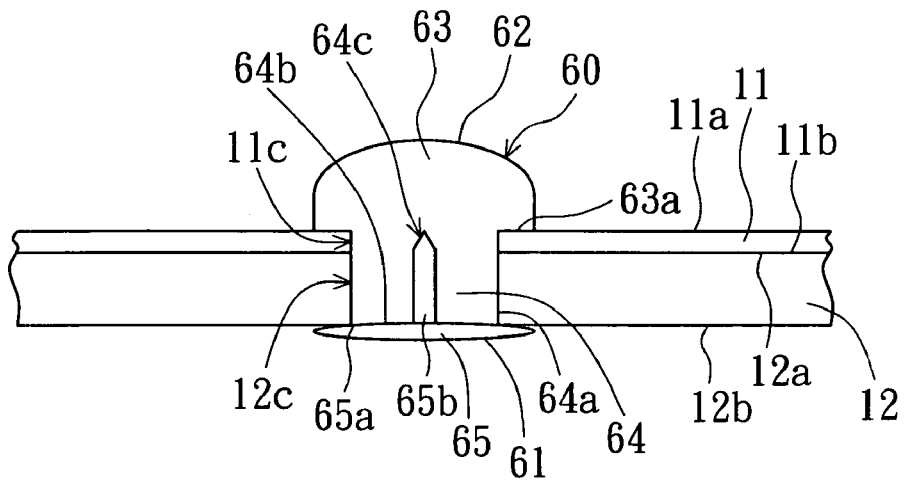
FIG. 6B is a combined cross-sectional view showing the backlight module according to the fifth example of the preferred embodiment of the invention.

Referring to FIGS. 6A~6B, FIG. 6A is an exploded cross-sectional view showing a backlight module according to the fifth example of the preferred embodiment of the invention, and FIG. 6B is a combined cross-sectional view showing the backlight module according to the fifth example of the preferred embodiment of the invention.

In FIGS. 6A~6B, a backlight module 200 includes a frame 11, a reflector 12 and a holding structure 60 for holding the reflector 11 on the frame 12 instead of using an adhesive conventionally. The holding structure 60 of the backlight module 200 a first clamp structure 61 and a second clamp structure 62. The first clamp structure 61 includes a first clamp portion 65 and a pin portion 65b disposed on the first clamp portion 65. The second clamp structure 62 includes a second clamp portion 63 and a shaft portion 64 disposed on the second clamp portion 63. The first clamp portion 65 and the pin portion 65b are integrally formed. The second clamp portion 63 and the shaft portion 64 are integrally formed. The second clamp portion 63 includes a second surface 63a. The shaft portion 64 has an external side surface 64a and a bottom surface 64b. The external side surface 64a connects with the second surface 63a and the bottom surface 64b. The bottom surface 64b has a fixing hole 64c for accommodating the pin portion 65b. The pin portion 65b is disposed on the first surface 65a and is used for inserting into the fixing hole 64c so as to movably combine the first clamp structure 61 and the second clamp structure 62.

As shown in FIG. 6A, when a user want to fix the reflector 11 on the frame 12, the user make the bottom surface 11b contact the top surface 12a and the through hole 11c correspond to the through hole 12c. Then, the user inserts the shaft portion 64 and the first clamp portion 65 into the through holes 11c and 12c from the top surface 11a. When the shaft portion 64 is inserted into the through holes 12c and 11c, the user inserts the pin portion 65b into the fixing hole 64c. The other part of the first surface 65a which doesn't contact to the bottom surface 64b and the second surface 63a respectively contact part of the bottom surface 12b and the top surface 11a. So that, the first clamp portion 65 and the second clamp portion 63 inwardly clamp the reflector 11, and the reflector 11 is fixed onto the frame 12.

However, any skilled in the art knows that the present invention is not limited thereto. For example, the material of the holding structure 60 of backlight module 200 is poly methyl methacrylate (PMMA) or a white material. Additionally, considering the first clamp portion 61 and the second clamp portion 62 have to be combined together after the pin portion 65b being inserted in the fixing hole 64c, once the sum of the thickness of the reflector and the frame is less than the height of the shaft portion 64, a washer can be further disposed between the first clamp portion 65 and the frame 12, or between the second clamp portion 63 and the reflector 11 to compensate the difference between the height of the shaft portion 64 and the sum of the thickness of the reflector and the frame.

SIXTH EXAMPLE

Figure 7A:
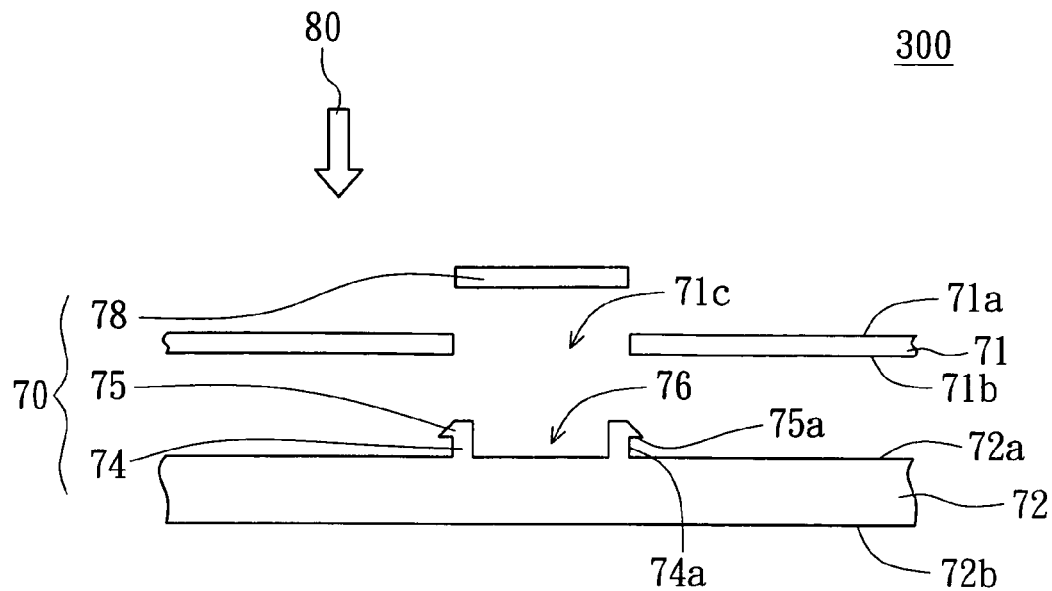
FIG. 7A is an exploded cross-sectional view showing a backlight module according to the sixth example of the preferred embodiment of the invention.
Figure 7B:
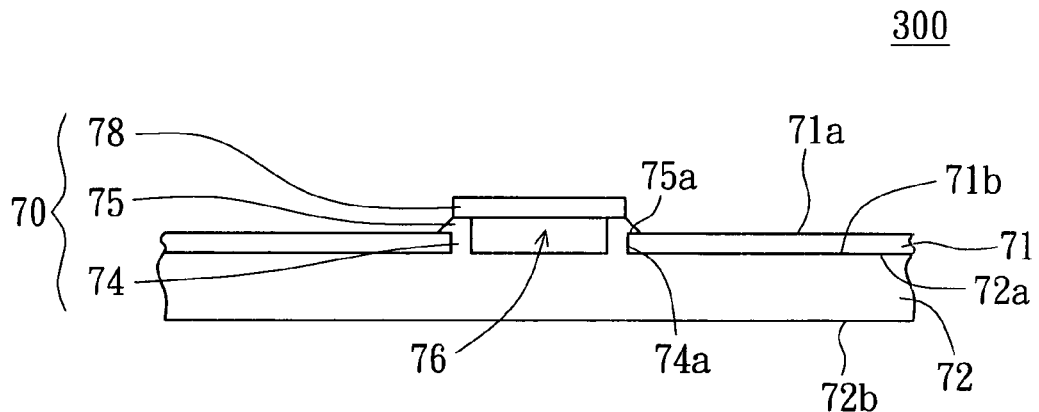
FIG. 7B is a combined cross-sectional view showing the backlight module according to the sixth example of the preferred embodiment of the invention.

Referring to FIGS. 7A~7B, FIG. 7A is an exploded cross-sectional view showing a backlight module according to the sixth example of the preferred embodiment of the invention, and FIG. 7B is a combined cross-sectional view showing the backlight module according to the sixth example of the preferred embodiment of the invention.

In FIGS. 7A~7B, a backlight module 300 includes a frame 71, a reflector 72 and a holding structure 70 for holding the reflector 71 on the frame 72. The reflector 71 has a top surface 71a, an opposite bottom surface 71b, and a through hole 71c which penetrates the top surface 71a and the bottom surface 71b. The frame 72 has a top surface 72a and an opposite bottom surface 72b.

The holding structure 70 at least includes a shaft portion 74 and a clamp portion 75. The shaft portion 74 has an external side surface 74a and is vertically disposed on the top surface 72a of the frame 72. The shaft portion 74 is adapted for inserting into the through hole 71c of the reflector 71. The clamp portion 75 is disposed on the top of the shaft portion 74 and has a clamp surface 75a which is opposite to the top surface 72a and faces the top surface 72a. The external side surface 74a connects the clamp surface 75a and the top surface 72a. Further, the shaft portion 74 and the clamp portion 75 have a through hole 76. The clamp portion 75 is preferably a hook structure that bends to the outside of the opening of the through hole 76. In the sixth example, the holding structure 70 of backlight module 300 further includes a cover 78 on the clamp portion 75 for capping one end of the through hole 76. The material of the cover 78 is poly methyl methacrylate (PMMA) or a white material.

As shown in FIG. 7A, when a user wants to fix the reflector 71 on the frame 72, the user presses the reflector 71 on the frame 72 along the direction of arrow 80 in FIG. 7A when the through hole 71c corresponds to the clamp portion 75 and the shaft portion 74. Then the shaft portion 74 and the clamp portion 75 are inserted into the through hole 71c. When the clamp portion 75 passes through the through hole 71c and the shaft portion 74 is inserted into the through hole 71c, the clamp portion 75 is exposed out of the top surface 71a and the clamp surface 75a contacts part of the top surface 71a. So that, the clamp portion 75 and the frame 72 inwardly clamp the reflector 71, and the reflector 71 is fixed onto the frame 72. And then, the users put the cover 78 on the clamp portion 75 for closing one end of the through hole 76.

However, any skilled in the art knows that the present invention is not limited thereto. For example, the clamp portion 75 and the shaft portion 14 can be integrally formed. The frame 72, the clamp portion 75 and the shaft portion 74 can be integrally formed. Also, the material of the holding structure 70 of backlight module 300 includes poly methyl methacrylate (PMIMA) or a white material.

SEVENTH EXAMPLE

Figure 8:
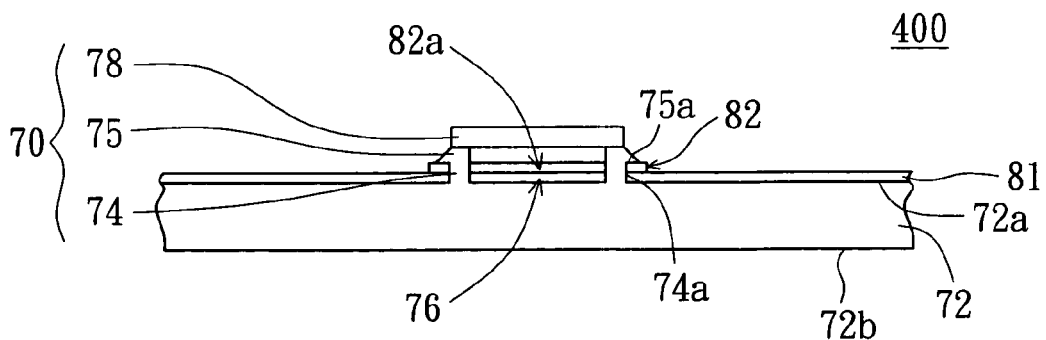
FIG. 8 is a combined cross-sectional view showing the backlight module according to the seventh example of the preferred embodiment of the invention.

Referring to FIG. 8, it is an exploded cross-sectional view showing a backlight module according to the seventh example of the preferred embodiment of the invention. The difference between the backlight module 400 and 300 is the reflector 81 and the washer 82. In FIG. 8, the reflector 81 is thinner than the reflector 71 of the backlight module 300. The reflector 81 is disposed on the top surface 72a of the frame 72. The washer 82 has a through hole 82a. When the shaft portion 74 is inserted into the through hole 82a, the washer 82 is disposed between the clamp portion 75 and the reflector 81 to compensate the difference between the height of the shaft portion 74 and the thickness of the reflector 81. So that, the clamp portion 75 and the frame 72 inwardly clamp the washer 82 and the reflector 81.

Instead of using an adhesive connecting the reflector onto the frame conventionally, the holding structure of the backlight module disclosed in the present invention not only omits the procedure of applying the adhesive, but also prevents roughness and unevenness in surface between the reflector and the frame. As a result, "mura" showing on screen can be prevented and the displaying quality of LCDs can be improved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module, comprising:
   a frame having a first top surface;
   a reflector having a first through hole, a second top surface and a bottom surface on the frame, wherein the bottom surface faces the first top surface; and
   a holding structure for holding the reflector on the frame, comprising:
      a shaft portion having an external side surface disposed on the first top surface and being adapted for inserting into the first through hole; and
      a clamp portion disposed on the top of the shaft portion, wherein the clamp portion has a clamp surface facing the first top surface and connecting to the first top surface via the external side surface, wherein the clamp portion are exposed out of the second top surface and contacts part of the second top surface when the shaft portion is inserted into the first through hole, so that the clamp portion and the frame clamp the reflector.

2. The backlight module according to claim 1, wherein the clamp portion and the shaft portion are integrally formed.

3. The backlight module according to claim 2, wherein the shaft portion and the clamp portion has a second through hole.

4. The backlight module according to claim 3, wherein the clamp portion is a hook structure that bends to the outside of the opening of the second through hole.

5. The backlight module according to claim 3, further comprising:
   a cover disposed on the clamp portion to cap one end of the second through hole.

6. The backlight module according to claim 5, wherein the cover includes poly methyl methacrylate (PMIMA) or a white material.

7. The backlight module according to claim 1, wherein the holding structure includes poly methyl methacrylate (PMMA) or a white material.

8. The backlight module according to claim 1, wherein the holding structure further comprises:
   a washer having a second through hole disposed between the clamp portion and the reflector, wherein the shaft portion is inserted into the first through hole and the second through hole.

* * * * *